United States Patent
Kazem et al.

(10) Patent No.: US 12,287,801 B2
(45) Date of Patent: Apr. 29, 2025

(54) GENERATING TRANSFORMATIONS OF ANALYTIC ARTIFACTS

(71) Applicant: International Business Machines Corporation, Armonk, NY (US)

(72) Inventors: Firas Kazem, Kanata (CA); Anthony Nicola Tasca, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/227,127

(22) Filed: Apr. 9, 2021

(65) Prior Publication Data
US 2022/0327136 A1 Oct. 13, 2022

(51) Int. Cl.
*G06F 16/25* (2019.01)
*G06F 16/2455* (2019.01)
*G06F 16/2457* (2019.01)
*G06F 16/26* (2019.01)
*G06N 5/01* (2023.01)

(52) U.S. Cl.
CPC ...... *G06F 16/254* (2019.01); *G06F 16/24565* (2019.01); *G06F 16/24578* (2019.01); *G06F 16/26* (2019.01); *G06N 5/01* (2023.01)

(58) Field of Classification Search
CPC ............. G06F 16/254; G06F 16/24565; G06F 16/24578; G06F 16/26; G06N 5/003; G06N 5/01; G06Q 10/06; G06T 11/206
See application file for complete search history.

(56) References Cited

U.S. PATENT DOCUMENTS

| | | | |
|---|---|---|---|
| 9,240,061 B2 | 1/2016 | Breedvelt-Schouten | |
| 9,996,241 B2 | 6/2018 | Kikin-Gil et al. | |
| 11,030,552 B1* | 6/2021 | Gustafsson | G06Q 10/063 |

(Continued)

OTHER PUBLICATIONS

Dundas BI, "Dundas BI Product Features," https://www.dundas.com/dundas-bi/features, 2020, pp. 1-34.

(Continued)

*Primary Examiner* — Etienne P Leroux
*Assistant Examiner* — Oscar Wehovz
(74) *Attorney, Agent, or Firm* — Shackelford, McKinley & Norton, LLP; Robert A. Voigt, Jr.

(57) ABSTRACT

A computer-implemented method, system and computer program product for generating a visual transformation of a business analytic artifact. Features from a received business analytic artifact (e.g., dashboard) are extracted. Furthermore, constraints are determined for a transformed representation of the business analytic artifact. A heuristic-based search is then performed on a space of possible transformed representations of the business analytic artifact using the extracted features to identify a transformed version that satisfies the determined constraints and maximizes readability. A final score is then generated for each possible transformed representation of the business analytic artifact based on the extent that the transformed version satisfies the determined constraints and maximizes the readability. The transformed representation of the business analytic artifact that has the highest score is selected and displayed on the target device. In this manner, meaningful transformations of business analytic artifacts are generated and displayed on a computing device with minimal distortion.

20 Claims, 6 Drawing Sheets

(56) References Cited

U.S. PATENT DOCUMENTS

| | | | |
|---|---|---|---|
| 2015/0278371 A1* | 10/2015 | Anand | G06F 16/9038 |
| | | | 707/723 |
| 2015/0302051 A1 | 10/2015 | Baumgartner et al. | |
| 2016/0104307 A1 | 4/2016 | Allyn et al. | |
| 2017/0249369 A1* | 8/2017 | Mackinlay | G06F 16/252 |

OTHER PUBLICATIONS

Anonymous, "Output Adaptor," ip.com, IPCOM000233775D, Dec. 19, 2013, pp. 1-3.

Microsoft, "Optimize Power BI Reports for the Mobile App," https://docs.microsoft.com/en-us/power-bi/create-reports/desktop-create-phone-report, Jun. 15, 2020, pp. 1-8.

Oracle, "Fusion Middleware User's Guide for Oracle Data Visualization," https://docs.oracle.com/middleware/bi12214/biee/BIVUG/GUID-9FF49F4A-1447-4C5E-ADE7-198B8BFC4457.htm#BIVUG-GUID-9FF49F4A-1447-4C5E-ADE7-198B8BFC4457, 2018, pp. 1-24.

* cited by examiner

GENERATING TRANSFORMATIONS OF ANALYTIC ARTIFACTS

TECHNICAL FIELD

The present disclosure relates generally to data visualization, and more particularly to generating transformations of analytic artifacts (e.g., dashboards, reports, charts) that fit a certain set of constraints with readability.

BACKGROUND

Data visualization is an interdisciplinary field that deals with the graphic representation of data. It is a particularly efficient way of communicating when the data is numerous, as for example, a time series. From an academic point of view, this representation can be considered as a mapping between the original data (usually numerical) and graphic elements (for example, lines or points in a chart). The mapping determines how the attributes of these elements vary according to the data.

SUMMARY

In one embodiment of the present disclosure, a computer-implemented method for generating a visual transformation of a business analytic artifact comprises receiving the business analytic artifact. The method further comprises extracting features from the business analytic artifact. The method additionally comprises determining constraints for a transformed representation of the business analytic artifact. Furthermore, the method comprises performing a heuristic-based search on a space of a plurality of transformed representations of the business analytic artifact using the extracted features. Additionally, the method comprises generating a final score for each of the plurality of transformed representations of the business analytic artifact based on extent its transformed representation of the business analytic artifact satisfies the determined constraints and maximizes readability. In addition, the method comprises selecting a transformed representation of the business analytic artifact associated with a highest score. The method further comprises displaying the selected transformed representation of the business analytic artifact on a display of a computing device.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated in the Background section, data visualization is an interdisciplinary field that deals with the graphic representation of data. It is a particularly efficient way of communicating when the data is numerous, as for example, a time series. From an academic point of view, this representation can be considered as a mapping between the original data (usually numerical) and graphic elements (for example, lines or points in a chart). The mapping determines how the attributes of these elements vary according to the data.

To communicate information clearly and efficiently, data visualization uses statistical graphics, plots, information graphics and other tools. Numerical data may be encoded using dots, lines, or bars, to visually communicate a quantitative message. Effective visualization helps users analyze and reason about data and evidence. It makes complex data more accessible, understandable and usable. Users may have particular analytical tasks, such as making comparisons or understanding causality, and the design principle of the graphic (i.e., showing comparisons or showing causality) follows the task. Tables are generally used where users will look up a specific measurement, while charts of various types are used to show patterns or relationships in the data for one or more variables.

In connection with data visualization, business analytic artifacts, such as dashboards, reports and charts, may need to be transformed into different shapes, sizes, resolutions, etc., such as by cropping, resizing, etc., when depicted on a different display. For example, since different displays possess different features, such as different screen shapes, sizes and resolutions, the visualizations of the business analytic artifacts depicted on such different displays may differ. For instance, the shapes, sizes, resolutions, etc. of the business analytic artifacts may differ when displayed on the display of a desktop computing device versus being displayed on the display of a mobile device, such as a smartphone.

Unfortunately, when the business analytic artifacts are transformed, such as by resizing and cropping, the transformed business analytic artifact may be distorted to the extent that the visualization no longer effectively visualizes the data.

Different data visualization systems have been developed in an attempt to minimize such distortions, such as by having the layout engine adapt the layout to react to changes in the available display space (e.g., alternate number of columns in a grid based on the screen size for an application with a grid view) or by reducing the padding between widgets or providing alternate views of individual widgets (e.g., compact versus full view).

Unfortunately, despite such efforts, business analytic artifacts, such as dashboards, reports and charts, still become distorted when transformed and depicted on a different display.

The embodiments of the present disclosure provide a means for generating a visual transformation of a business analytic artifact that fits a set of constraints and maximizes readability in a manner that limits the amount of distortion when depicted on a different display.

In some embodiments of the present disclosure, the present disclosure comprises a computer-implemented method, system and computer program product for generating a visual transformation of a business analytic artifact. In one embodiment of the present disclosure, features (e.g., layout position, size) from a received business analytic artifact (e.g., dashboard, report, chart) are extracted. Furthermore, constraints are determined for a transformed representation of the business analytic artifact. In one embodiment, such constraints are based on the target device (device upon which the transformed representation of the business analytic artifact will be displayed). Examples of constraints include, but not limited to, target height and/or width of the transformed representation of the business analytic artifact, the target aspect ratio of the transformed representation of the business analytic artifact, etc. A heuristic-based search is then performed on a space of possible transformed representations of the business analytic artifact using the extracted features to identify a transformed version that satisfies the determined constraints and maximizes readability. A final score is then generated for each possible transformed representation of the business analytic artifact based on the extent that the transformed representation of the business analytic artifact satisfies the determined constraints and maximizes the readability. The transformed representation of the business analytic artifact that has the highest score is selected and displayed on the target device. In this manner, meaningful transformations of business analytic artifacts are generated and displayed on a computing device (e.g., smartphone) with minimal distortion.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Figure 1:
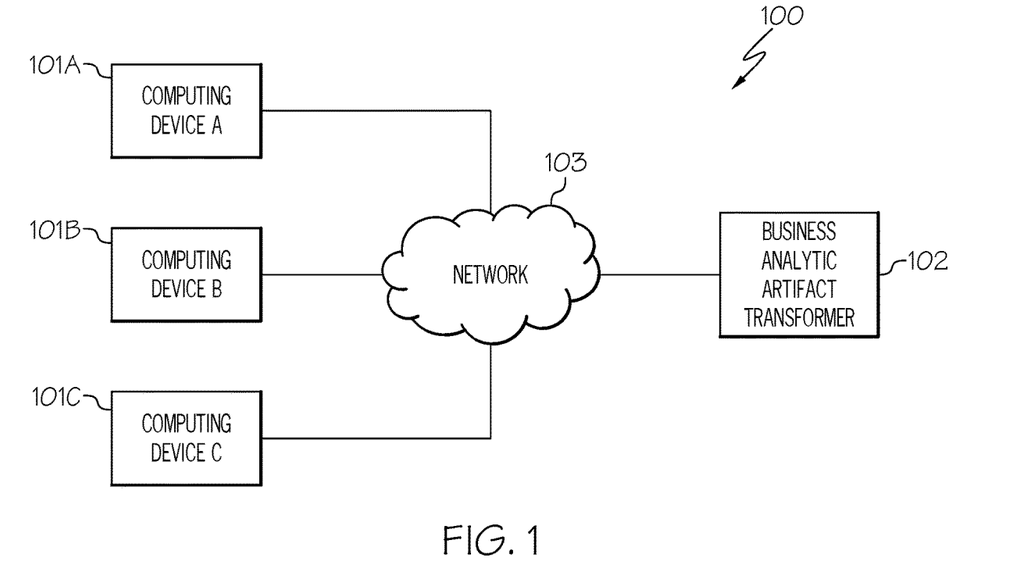
FIG. 1 illustrates a communication system for practicing the principles of the present disclosure in accordance with an embodiment of the present disclosure.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a device, referred to herein as the "business analytic artifact transformer 102," via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and business analytic artifact transformer 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

Business analytic artifact transformer 102 is configured to generate a visual transformation of a business analytic artifact (e.g., dashboards (data visualization tool), reports, charts) so that the target device (e.g., computing device 101B) is able to display the business analytic artifact in a manner with minimal distortion. In one embodiment, business analytic artifact transformer 102 generates a visual transformation of the business analytic artifact for the target device with minimal distortion based on satisfying constraints for the transformed business analytic artifact and maximizing readability in the visualization of the transformed business analytic artifact as discussed in greater detail below.

A description of the software components of business analytic artifact transformer 102 is provided below in connection with FIG. 2 and a description of the hardware configuration of business analytic artifact transformer 102 is provided further below in connection with FIG. 5.

System 100 is not to be limited in scope to any one particular network architecture. System 100 may include any number of computing devices 101, business analytic artifact transformers 102, and networks 103.

A discussion regarding the software components used by business analytic artifact transformer 102 to generate a visual transformation of a business analytic artifact is provided below in connection with FIG. 2.

Figure 2:
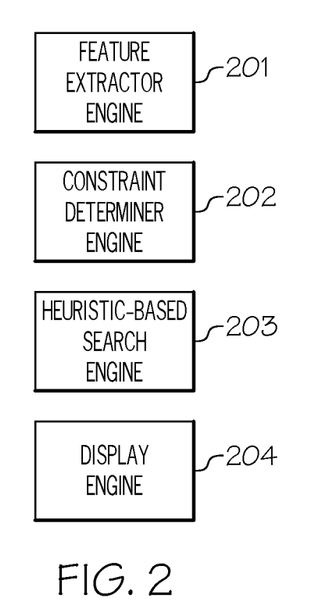
FIG. 2 is a diagram of the software components of the business analytic artifact transformer used to generate a visual transformation of a business analytic artifact in accordance with an embodiment of the present disclosure.

FIG. 2 is a diagram of the software components of business analytic artifact transformer 102 (FIG. 1) used to generate a visual transformation of a business analytic artifact in accordance with an embodiment of the present disclosure.

Referring to FIG. 2, in conjunction with FIG. 1, business analytic artifact transformer 102 includes feature extractor engine 201 configured to extract features from a business analytic artifact (e.g., dashboard, report, chart), such as the layout position, size and type of the visualization of the business analytic artifact. Other types of features may be extracted from the business analytic artifact, including, but not limited to, columns (data columns) bounded to the slots of the visualization, a filter, a sort order, an aggregation, a grouping and data (e.g., data points) rendered in the artifact. Furthermore, in one embodiment, feature extractor engine 201 extracts features, such as data columns, including their statistics, ontological concepts and how they are visualized in the business analytic artifact. In one embodiment, "data columns," as used herein, refer to columns of data presented in the business analytic artifact. In one embodiment, the "statistics" of the data columns, as used herein, refer to the data contained within the data columns. In one embodiment, ontological concepts are extracted by feature extractor engine 201 utilizing natural language processing. For example, feature extractor engine 201 may extract the ontological concepts from the data columns by matching terms in the data columns associated with concepts. Such terms may be stored in a data structure (e.g., table) containing keywords or terms (e.g., sports, travel) associated with concepts. In one embodiment, such a data structure is stored in a storage medium (e.g., memory, disk drive) of business analytic artifact transformer 102.

In one embodiment, the features of the business analytic artifact may be stored in metadata associated with the artifact. For example, such metadata may include the layout position, size as well as the type(s) of visualization(s) depicted in the artifact. Such metadata may be read by feature extractor engine 201. In one embodiment, such metadata is stored in a storage medium (e.g., memory, disk drive) of business analytic artifact transformer 102.

In one embodiment, feature extractor engine 201 extracts the features from a business analytic artifact using principal component analysis. In principal component analysis, relationships among features are identified through a covariance matrix. Through a linear transformation or eigen decomposition of the covariance matrix, eigenvectors and eigenvalues are obtained. Using eigenvectors, data is transformed into principal components. Lastly, the importance of these relationships are quantified using eigenvalues and the important principal components are kept.

In one embodiment, feature extractor engine 201 extracts the features from a business analytic artifact by first selecting the features to extract, such as the layout position, size, data columns, applied filters, etc. Such features to be extracted may be populated in a data structure (e.g., table) by an expert, which may be stored in a storage medium (e.g., memory, disk drive) of business analytic artifact transformer 102. Feature extractor engine 201 then selects the features to be extracted from the business analytic artifact based on those features listed in such a data structure. In one embodiment, feature extractor engine 201 selects such features to be extracted in the business analytic artifact using correlation, univariate feature selection, tree-based feature selection, etc. In one embodiment, such features may then be extracted using principle component analysis.

In one embodiment, feature extractor engine 201 extracts features from a business analytic artifact, such as a graph, using various software tools, such as the node2Vec, struc2vec, and DeepWalk, which create graph embeddings. Such embeddings may be used to build a k-nearest neighbor similarity graph, where the similarity graph could then be used to make recommendations (feature recommendations) as part of a k-nearest neighbor query.

Business analytic artifact transformer 102 further includes constraint determiner engine 202 configured to determine constraints for a transformed representation of the business analytic artifact. In one embodiment, constraint determiner engine 202 determines such constraints based on the target device (e.g., computing device 101) to display the transformed business analytic artifact, which may be provided to business analytic artifact transformer 102 from the user of the target device (e.g., computing device 101). Such constraints include, but not limited to, target height and/or width of the transformed representation of the business analytic artifact, the target aspect ratio of the transformed representation of the business analytic artifact, etc.

In one embodiment, constraint determiner engine 202 determines the constraints for the transformed representation of the business analytic artifact based on the attributes (e.g., size, aspect ratio, etc.) of the area that the new artifact will be rendered. Such attributes may be determined based on the target device provided by the user (e.g., user of computing device 101). In one embodiment, constraint determiner engine 202 utilizes a data structure (e.g., table) that lists the attributes associated with various target devices. Once constraint determiner engine 202 receives an identification of the target device from the user, constraint determiner engine 202 searches the data structure for that target device. After identifying the target device in the data structure, constraint determiner engine 202 obtains the attributes associated with that target device from the data structure. For example, if the target device is a particular smartphone computing device, then such a smartphone may be associated with the attributes of a particular resolution, a particular width of the display area, etc.

In one embodiment, constraint determiner engine 202 receives the constraints for the transformed representation of the business analytic artifact directly from the user (e.g., user of computing device 101). Such constraints may be inputted by the user to computing device 101 via an input means (e.g., keyboard, mouse), which may be transmitted to business analytic artifact transformer 102 via network 103. In one embodiment, various options for constraints (e.g., screen size, aspect ratio) may be presented to the user (e.g., user of computing device 101) on the graphical user interface of computing device 101. User selections of these constraint options may then be transmitted to business analytic artifact transformer 102 via network 103. For example, the user may input the constraint of having the browser window fit a 2:1 aspect ratio with a height of 500 pixels.

Business analytic artifact transformer 102 further includes a heuristic-based search engine 203 configured to search on a space of possible transformed representations (e.g., resizing, cropping, etc.) of the business analytic artifact using the extracted features to identify a transformed version that satisfies the determined constraints and maximizes readability of the transformed business analytic artifact. In one embodiment, the heuristic-based search engine 203 utilizes a heuristic search algorithm that performs an A* search on the space of artifact transformations.

In one embodiment, heuristic-based search engine 203 utilizes a heuristic search algorithm for identifying a transformed version that satisfies the determined constraints and maximizes readability using a search tree. In one embodiment, at each step of the search tree, one or more of the following actions may take place: resizing a visualization, removing a visualization, cropping a visualization and repositioning a visualization.

With respect to resizing a visualization, a visualization of the business analytic artifact may be resized (e.g., modify height and width) so as to satisfy the constraints of the target device, such as screen size, aspect ratio, etc. For example, given a dashboard with three rows of visualizations, two of the visualizations could be resized so as to place them on the same row.

With respect to removing a visualization, a visualization of the business analytic artifact may be removed because it contains low-valued data points or has redundant columns of data. "Low-valued data points," as used herein, refer to those data points that are less important in understanding the visualization of the business analytic artifact, such as containing redundant information or information not related to the topic of the visualization. In one embodiment, redundant information may be identified using natural language processing based on identifying matching data. In one embodiment, information not related to the topic of the visualization may be identified using natural language processing. In one embodiment, heuristic-based search engine 203 first identifies the topic of the visualization followed by determining if any information in the visualization is not related to the topic of the visualization using natural language processing. For example, heuristic-based search engine 203 may utilize a data structure (e.g., table) containing a listing of terms associated with topics. If any of these terms are identified in the visualization, then heuristic-based search engine 203 infers the topic of the visualization. In one embodiment, such a data structure is stored in the storage medium (e.g., memory, disk drive) of business analytic artifact transformer 102. In one embodiment, the topic of the visualization may be determined by heuristic-based search engine 203 using natural language processing to identify the noun or subject in the visualization. Such identified nouns or subjects may be used to match any topics listed in the data structure discussed above.

With respect to cropping a visualization, such cropping may involve removing a data point from the visualization. For example, low-valued data points may be removed from a visualization, such as similar bars in a bar chart. In another example, cropping may involve removing the title, axis, labels, padding, etc.

With respect to repositioning a visualization, such repositioning involves placing the visualization in a different position or adjusting or altering the position of the visualization. For example, heuristic-based search engine 203 may reposition the visualization by placing the visualization in the left-center of the display in comparison to being in the center of the display of the source device depicting the original business analytic artifact.

In one embodiment, heuristic-based search engine 203 is configured to generate a final score for each transformed version (transformed version or representation of the business analytic artifact) based on the extent that the transformed version satisfies the determined constraints and maximizes readability. In one embodiment, the final score is a scaled score between the values of 0 to 1. In one embodiment, the "final score" for each transformed version is based on a series of scores assigned to each feature (each extracted feature) and/or visualizations of the transformed representation of the business analytic artifact. In one embodiment, each score assigned to each feature and/or visualizations of the transformed representation of the business analytic artifact is a scaled score between the values of 0 and 1, where the scaled score is based on how close the feature and/or visualization of the transformed version satisfies the constraints of the target device as discussed further below. In one embodiment, the closer that the feature and/or visualization of the transformed version satisfies the constraints of the target device, the higher the score and vice-versa.

In one embodiment, heuristic-based search engine 203 assigns different weight values to each feature (each extracted feature) of the transformed representation of the business analytic artifact. In one embodiment, the final score for the transformed representation of the business analytic artifact is based on the score assigned to each feature of the transformed representation of the business analytic artifact multiplied by the weight values assigned to the features of the transformed representation of the business analytic artifact.

In one embodiment, the transformed representation of the business analytic artifact is assigned a score based on predetermined criteria, which may be user-specified, that includes one or more of the following: number of data points being rendered in the transformed representation of the business analytic artifact, number of high-valued data points being rendered in the transformed representation of the business analytic artifact, number of column combinations being visualized in the transformed representation of the business analytic artifact, and number of high-valued columns being visualized in the transformed representation of the business analytic artifact. A "high-valued data point," as used herein, refers to data that has ontological and statistical influence. In one embodiment, such influence is determined by heuristic-based search engine 203 analyzing a data structure (e.g., table) that includes a listing of terms with data that has ontological and statistical influence. As a result, a high-valued data point may be identified by heuristic-based search engine 203 matching terms in the transformation with the terms of high-valued data (e.g., sales) in the data structure. In one embodiment, such a data structure is populated by an expert. In one embodiment, the data structure is stored in a storage device (e.g., memory, disk drive) of business analytic artifact transformer 102.

Examples of assigning a score to the transformed representation of the business analytic artifact based on predetermined criteria is discussed below.

As previously discussed, a score may be based on the number of data points being rendered in the transformed representation of the business analytic artifact. For example, a transformation that renders a greater number of data points in the visualization may receive a higher score than a transformation that renders fewer data points. For instance, if feature extractor engine 201 determines that a bar chart in one transformation displayed three distinct categories, but another transformation only has two distinct categories, then the latter transformation would receive a lower score by heuristic-based search engine 203.

Figure 3A:
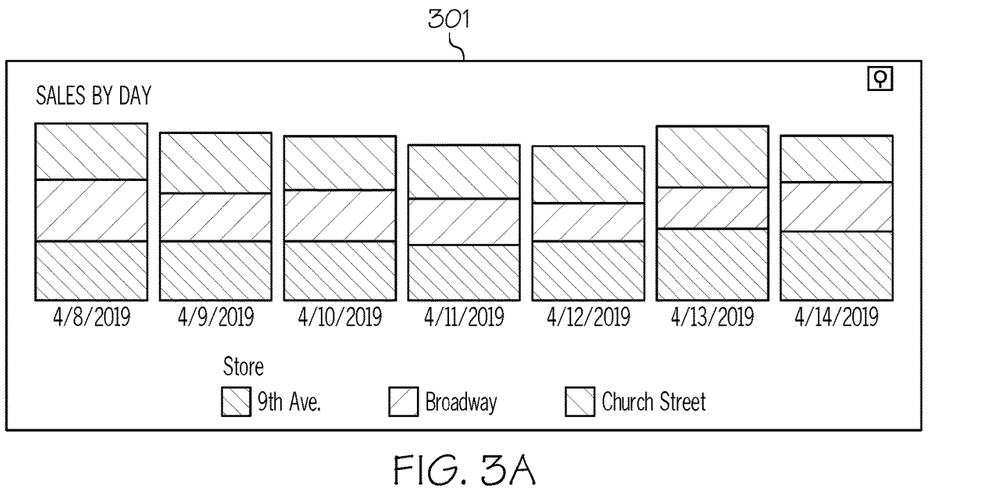
FIGS. 3A-3B illustrate transformations of the business analytic artifact involving a number of sales by day for three different stores in accordance with an embodiment of the present disclosure.
Figure 3B:
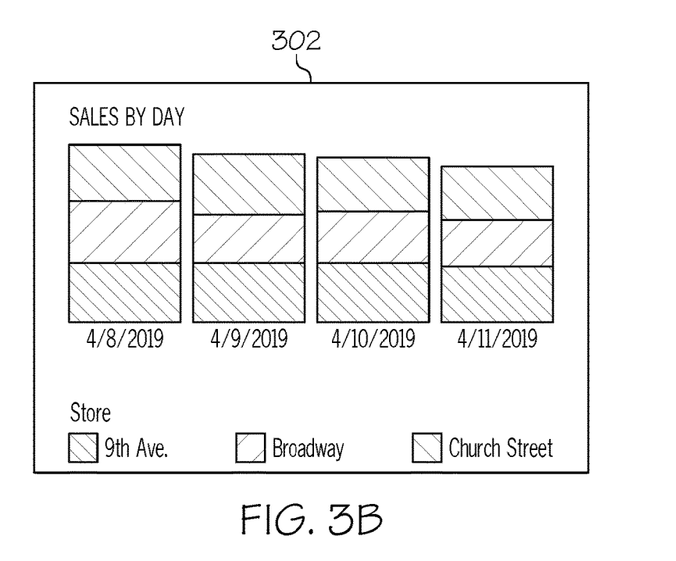

In another example, if feature extractor engine 201 determines that there are more data points regarding "sales by day" in one transformation versus another transformation, then the former transformation would receive a higher score by heuristic-based search engine 203 as illustrated in FIGS. 3A-3B.

FIGS. 3A-3B illustrate transformations of the business analytic artifact involving a number of sales by day for three different stores in accordance with an embodiment of the present disclosure.

Referring to FIG. 3A, transformation 301 (transformation of the business analytic artifact) includes sales by day data for three different stores (store on $9^{th}$ Avenue, store on Broadway and store on Church Street) for the days of Apr. 8-Apr. 14, 2019. Referring to FIG. 3B, transformation 302 (transformation of the business analytic artifact) includes sales by day data for three different stores (store on $9^{th}$ Avenue, store on Broadway and store on Church Street) for the days of Apr. 8-Apr. 11, 2019. Since transformation 301 includes more data points than transformation 302, it would receive a higher score than transformation 302.

Figure 4A:
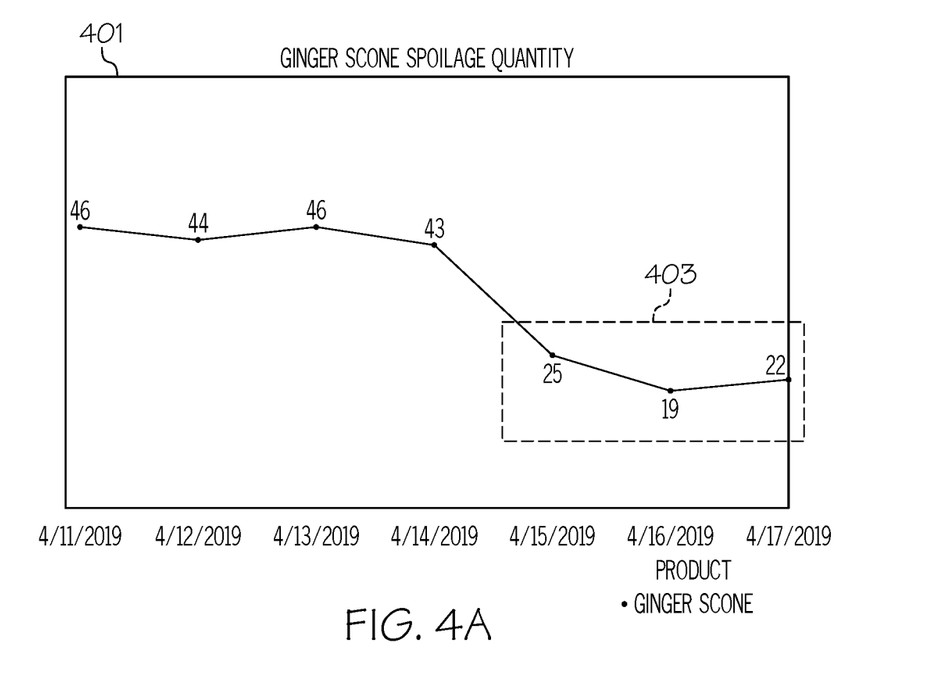
FIGS. 4A-4B illustrate transformations of the business analytic artifact involving a quantity of spoilage of the product, ginger scone, in accordance with an embodiment of the present disclosure.
Figure 4B:
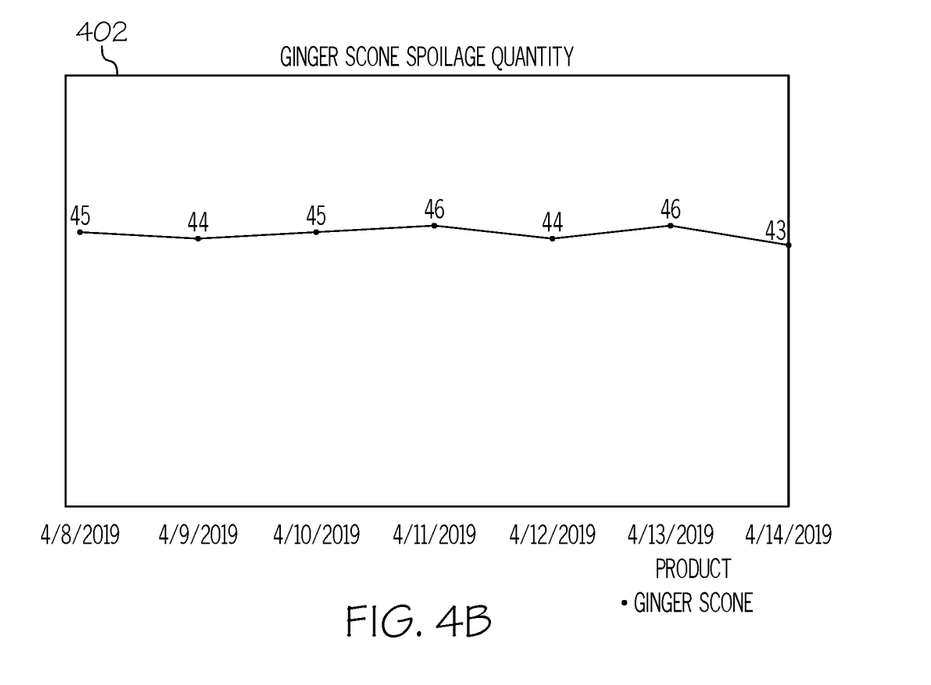

Returning to FIG. 2, in conjunction with FIGS. 1 and 3A-3B, as previously discussed, a score may be based on the number of high-valued data points being rendered in the transformed representation of the business analytic artifact. For example, a transformation that results in a greater number of high-valued data points being rendered in the visualization will receive a higher score than a transformation that renders fewer high-valued data points. For instance, if feature extractor engine 201 determines that a line chart shows an anomaly in one transformation while the other transformation does not, then the former transformation will be assigned a higher score than the latter transformation by heuristic-based search engine 203 as shown in FIGS. 4A-4B. In one embodiment, feature extractor engine 201 determines if an anomaly occurs based on pattern variance. For example, feature extractor engine 201 analyzes the data points, such as in a graph, and when the variance between adjacent data points exceeds a threshold percentage, which may be user-selected, an anomaly may be said to be detected.

In one embodiment, feature extractor engine 201 utilizes metadata of the business analytic artifact (e.g., dashboard) to identify the data points that are anomalies. In one embodiment, feature extractor engine 201 utilizes anomaly detection software, such as Numenta®, Avora®, Splunk® Enterprise, Anodot, CrunchMetrics®, etc., to identify the data points that are anomalies.

FIGS. 4A-4B illustrate transformations of the business analytic artifact involving a quantity of spoilage of the product, ginger scone, in accordance with an embodiment of the present disclosure.

Referring to FIG. 4A, transformation 401 (transformation of the business analytic artifact) includes the spoilage quantity for the product, ginger scone, between the dates of Apr. 11-17, 2019. Referring to FIG. 4B, transformation 402 (transformation of the business analytic artifact) includes the spoilage quantity for the product, ginger scone, between the dates of Apr. 8-14, 2019. As illustrated in FIGS. 4A-4B, an anomaly 403, in which there is a significant dip in the spoilage quantity, is only shown in transformation 401 and not in transformation 402. As a result, transformation 401 will be assigned a higher score than transformation 402.

Returning to FIG. 2, in conjunction with FIGS. 1, 3A-3B and 4A-4B, as previously discussed, a score may be based on the number of column combinations being visualized in the transformed representation of the business analytic artifact. For example, a transformation that results in more column combinations being visualized will receive a higher score than a transformation that has fewer visualized column combinations. "Column combinations," as used herein, refer to having columns of data being displayed in combination in the visualization. For example, if feature extractor engine 201 determines that the transformation (transformation of the business analytic artifact) visualizes profit and revenue by time in a line chart that also shows averages while another transformation shows two summary widgets for average profit and sales, then the former transformation will be assigned a higher score due to having more column combinations being visualized.

Furthermore, as previously discussed, a score may be based on the number of high-valued columns being visualized in the transformed representation of the business analytic artifact. For example, a transformation (transformation of business analytic artifact) that results in a greater number of high-valued columns being visualized will have a higher score than a transformation (transformation of business analytic artifact) that visualizes a fewer number of high-valued columns. For instance, if a transformation visualizes "sales;" whereas, another transformation does not include "sales," then the former transformation will be assigned a higher score if "sales" is considered a high-valued column due to its ontological and statistical influence. A "high-valued column," as used herein, refers to data that has ontological and statistical influence. In one embodiment, such influence is determined by heuristic-based search engine 203 analyzing a data structure (e.g., table) that includes a listing of terms associated with data that has ontological and statistical influence. As a result, a high-valued column may be identified by heuristic-based search engine 203 matching terms in the transformation with the terms of high-valued data (e.g., sales) in the data structure. In one embodiment, such a data structure is populated by an expert. In one embodiment, such a data structure is stored in the storage medium (e.g., memory, disk drive) of business analytic artifact transformer 102.

In one embodiment, the user (e.g., user of computing device 101) can specify the amount of weight to be applied to satisfying the constraints versus maintaining recognizability of the data in the original artifact (original business analytic artifact). Such weight may be applied by heuristic-based search engine 203 in generating the final score for the transformed representation of the business analytic artifact.

In one embodiment, the heuristic function used by the search algorithm evaluates any given state (i.e., the transformed business analytic artifact) in the search tree using the factor of how close the current transformed artifact is to the determined constraints. For example, if the determined constraint is to create a new artifact (i.e., the transformed representation of the business analytic artifact) that has a maximum height of 100 pixels and the current transformed business analytic artifact that is being evaluated by the heuristic function is 200 pixels, then this state will receive a lower score by heuristic-based search engine 203 than a transformed representation of the business analytic artifact that is 150 pixels in height.

In one embodiment, the heuristic function used by the search algorithm may further evaluate any given state (i.e., the transformed business analytic artifact) in the search tree using the factor of how close the result of the feature extraction on the transformed business analytic artifact is to the features on the original business analytic artifact. In one embodiment, the closer the features extracted (e.g., layout position, size) on the transformed business analytic artifact are to the features on the original business analytic artifact, the higher the score assigned to the transformed business analytic artifact by heuristic-based search engine 203. In one embodiment, such a comparison is performed by comparison software tools (e.g., Adobe® Lightroom, Diffchecker, Image Comparer™ by Bolide® Software, ACDSee® Photo Studio Ultimate, etc.) to identify any differences. The greater the difference, the lower the score assigned to the transformed business analytic artifact by heuristic-based search engine 203 and vice-versa.

In one embodiment, such "closeness" may be determined using the differences in the extracted data points. For example, feature extractor engine 201 extracts features, including the underlying data displayed by the business analytic artifact (e.g., dashboard), so that changes in how the underlying data is displayed in the transformation (i.e., the transformed business analytic artifact) can be determined. The closer the underlying data in the transformed business analytic artifact is to the same underlying data in the original business analytic artifact, the better the "readability" is said to be and the higher the score assigned to the transformed business analytic artifact by heuristic-based search engine 203. In contrast, the farther the underlying data in the transformed business analytic artifact is to the same underlying data in the original business analytic artifact, the worse the "readability" is said to be and the lower the score assigned to the transformed business analytic artifact by heuristic-based search engine 203. In one embodiment, such a comparison is performed by comparison software tools (e.g., Adobe® Lightroom, Diffchecker, Image Comparer™ by Bolide® Software, ACDSee® Photo Studio Ultimate, JuxtAPPose, QlikView®, etc.) to identify any differences in the underlying data between the transformed business analytic artifact and the original business analytic artifact.

In one embodiment, heuristic-based search engine 203 selects the transformation (transformed representation or version of the business analytic artifact) that has the highest score to be displayed on the user's computing device (e.g., computing device 101).

Business analytic artifact transformer 102 further includes a display engine 204 configured to display the selected transformed representation or version of the business analytic artifact on a display of the user's computing device (e.g., computing device 101).

A further description of these and other functions is provided below in connection with the discussion of the method for generating a visual transformation of a business analytic artifact that fits a certain set of constraints with maximum readability.

Prior to the discussion of the method for generating a visual transformation of a business analytic artifact that fits a certain set of constraints with maximum readability, a description of the hardware configuration of business analytic artifact transformer 102 (FIG. 1) is provided below in connection with FIG. 5.

Figure 5:
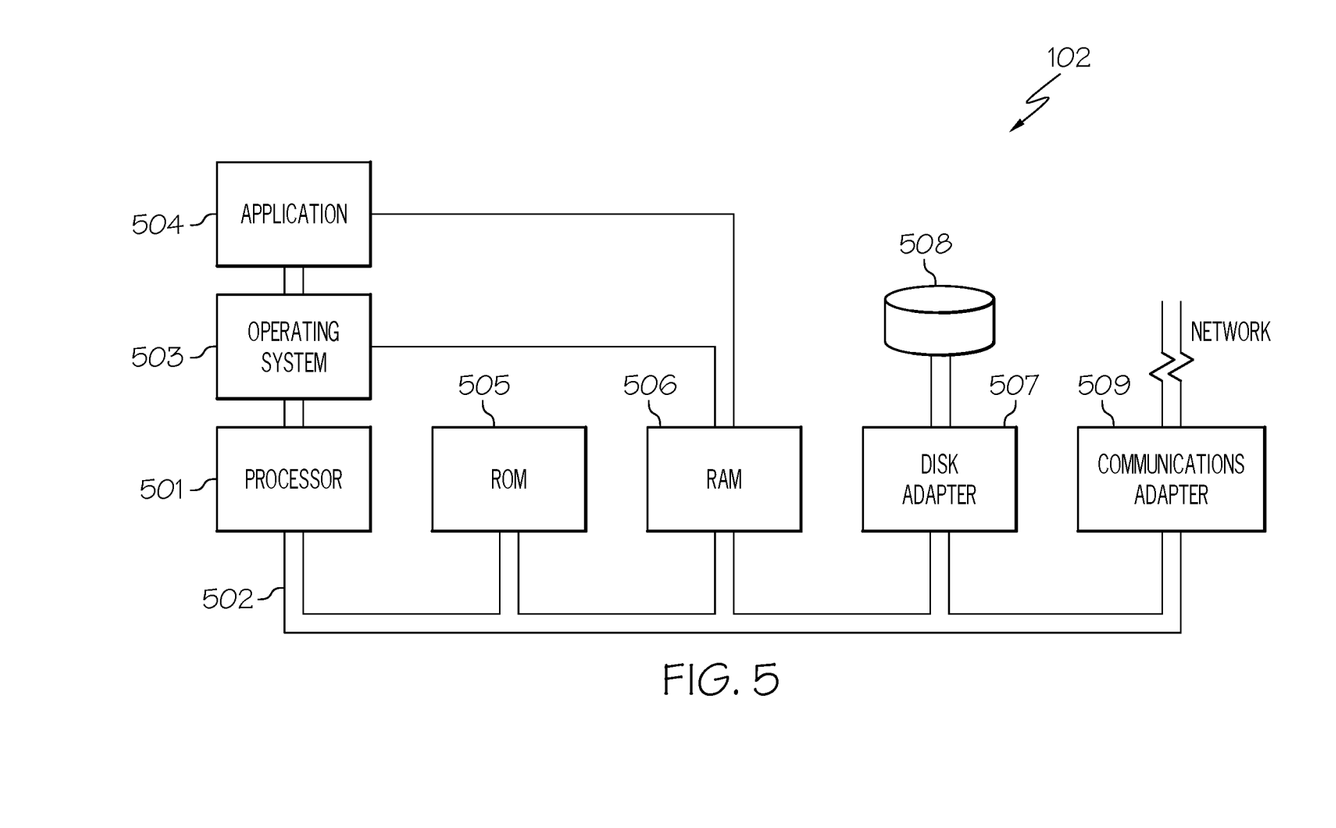
FIG. 5 illustrates an embodiment of the present disclosure of the hardware configuration of the business analytic artifact transformer which is representative of a hardware environment for practicing the present disclosure.

Referring now to FIG. 5, FIG. 5 illustrates an embodiment of the present disclosure of the hardware configuration of business analytic artifact transformer 102 (FIG. 1) which is representative of a hardware environment for practicing the present disclosure.

Business analytic artifact transformer 102 has a processor 501 connected to various other components by system bus 502. An operating system 503 runs on processor 501 and provides control and coordinates the functions of the various components of FIG. 5. An application 504 in accordance with the principles of the present disclosure runs in conjunction with operating system 503 and provides calls to operating system 503 where the calls implement the various functions or services to be performed by application 504. Application 504 may include, for example, feature extractor engine 201 (FIG. 2), constraint determiner engine 202 (FIG. 2), heuristic-based search engine 203 (FIG. 2) and display engine 204 (FIG. 2). Furthermore, application 504 may include, for example, a program for generating a visual transformation of a business analytic artifact that fits a certain set of constraints with maximum readability as discussed further below in connection with FIG. 6.

Referring again to FIG. 5, read-only memory ("ROM") 505 is connected to system bus 502 and includes a basic input/output system ("BIOS") that controls certain basic functions of business analytic artifact transformer 102. Random access memory ("RAM") 506 and disk adapter 507 are also connected to system bus 502. It should be noted that software components including operating system 503 and application 504 may be loaded into RAM 506, which may be business analytic artifact transformer's 102 main memory for execution. Disk adapter 507 may be an integrated drive electronics ("IDE") adapter that communicates with a disk unit 508, e.g., disk drive. It is noted that the program for generating a visual transformation of a business analytic artifact that fits a certain set of constraints with maximum readability, as discussed further below in connection with FIG. 6, may reside in disk unit 508 or in application 504.

Business analytic artifact transformer 102 may further include a communications adapter 509 connected to bus 502. Communications adapter 509 interconnects bus 502 with an outside network (e.g., network 103 of FIG. 1) to communicate with other devices, such as computing devices 101, etc.

In one embodiment, application 504 of business analytic artifact transformer 102 includes the software components of feature extractor engine 201, constraint determiner engine 202, heuristic-based search engine 203 and display engine 204. In one embodiment, such components may be implemented in hardware, where such hardware components would be connected to bus 502. The functions discussed above performed by such components are not generic computer functions. As a result, business analytic artifact transformer 102 is a particular machine that is the result of implementing specific, non-generic computer functions.

In one embodiment, the functionality of such software components (e.g., feature extractor engine 201, constraint determiner engine 202, heuristic-based search engine 203 and display engine 204) of business analytic artifact transformer 102, including the functionality for generating a visual transformation of a business analytic artifact, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, data visualization is an interdisciplinary field that deals with the graphic representation of data. To communicate information clearly and efficiently, data visualization uses statistical graphics, plots, information graphics and other tools. In connection with data visualization, business analytic artifacts, such as dashboards, reports and charts, may need to be transformed into different shapes, sizes, resolutions, etc., such as by cropping, resizing, etc., when depicted on a different display. For example, since different displays possess different features, such as different screen shapes, sizes and resolutions, the visualizations of the business analytic artifacts depicted on such different displays may differ. For instance, the shapes, sizes, resolutions, etc. of the business analytic artifacts may differ when displayed on the display of a desktop computing device versus being displayed on the display of a mobile device, such as a smartphone. Unfortunately, when the business analytic artifacts are transformed, such as by resizing and cropping, the transformed business analytic artifact may be distorted to the extent that the visualization no longer effectively visualizes the data. Different data visualization systems have been developed in an attempt to minimize such distortions, such as by having the layout engine adapt the layout to react to changes in the available display space (e.g., alternate number of columns in a grid based on the screen size for an application with a grid view) or by reducing the padding between widgets or providing alternate views of individual widgets (e.g., compact versus full view). Unfortunately, despite such efforts, business analytic artifacts, such as dashboards, reports and charts, still become distorted when transformed and depicted on a different display.

The embodiments of the present disclosure provide a means for generating a visual transformation of a business analytic artifact that fits a set of constraints and maximizes readability in a manner that limits the amount of distortion when depicted on a different display as discussed below in connection with FIG. 6.

Figure 6:
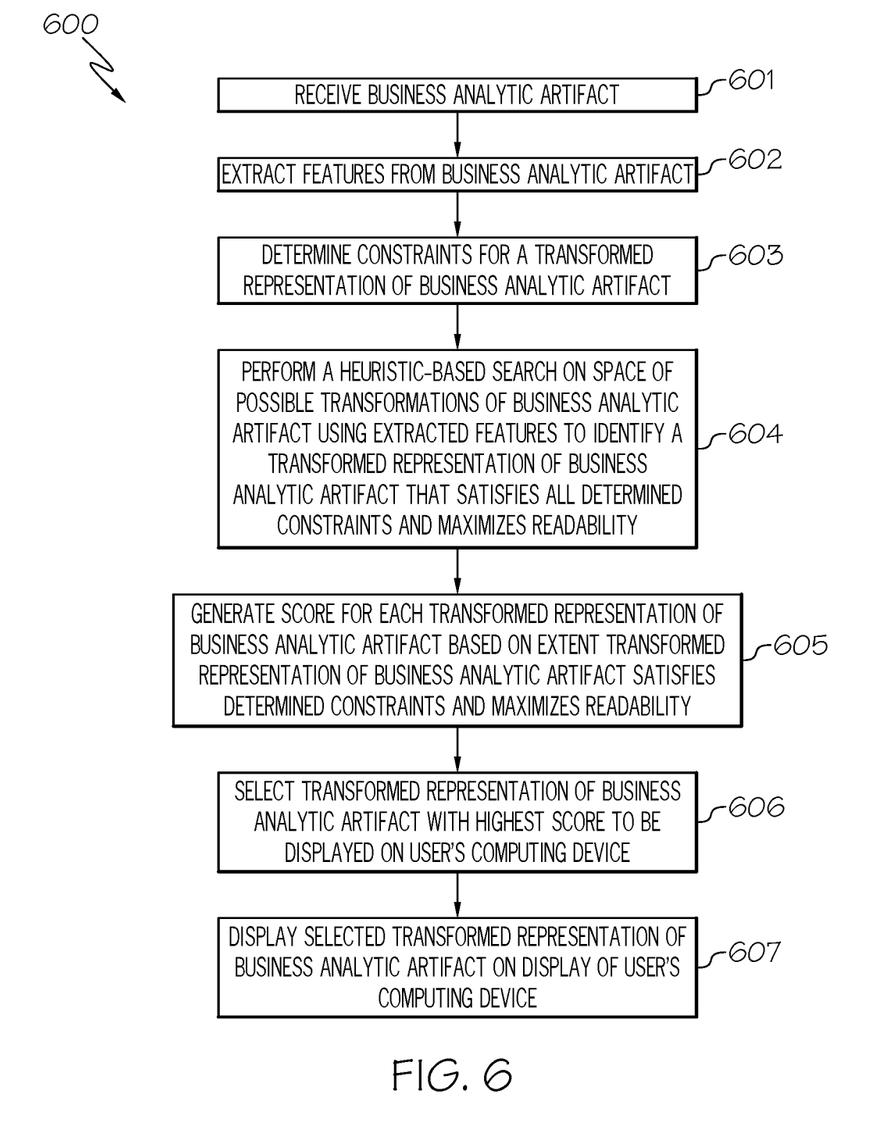
FIG. 6 is a flowchart of a method for generating a visual transformation of a business analytic artifact that fits a set of constraints and maximizes readability in accordance with an embodiment of the present disclosure.

FIG. 6 is a flowchart of a method 600 for generating a visual transformation of a business analytic artifact that fits a set of constraints and maximizes readability in accordance with an embodiment of the present disclosure.

Referring to FIG. 6, in conjunction with FIGS. 1-2, 3A-3B, 4A-4B and 5, in operation 601, business analytic artifact transformer 102 receives a business analytic artifact (e.g., dashboard, report, chart). In one embodiment, the business analytic artifact is received from a user of computing device 101.

In operation 602, feature extractor engine 201 of business analytic artifact transformer 102 extracts the features from the received business analytic artifact, such as the layout position, size, type of visualization, columns bounded to slots of visualization, a filter, a sort order, an aggregation, a grouping and data.

As discussed above, in one embodiment, in one embodiment, the features of the business analytic artifact may be stored in metadata associated with the artifact. For example, such metadata may include the layout position, size as well as the type(s) of visualization(s) depicted in the artifact. Such metadata may be read by feature extractor engine 201. In one embodiment, such metadata is stored in a storage medium (e.g., memory, disk drive) of business analytic artifact transformer 102.

In one embodiment, feature extractor engine 201 extracts the features from a business analytic artifact using principal component analysis. In principal component analysis, relationships among features are identified through a covariance matrix. Through a linear transformation or eigen decomposition of the covariance matrix, eigenvectors and eigenvalues are obtained. Using eigenvectors, data is transformed into principal components. Lastly, the importance of these relationships are quantified using eigenvalues and the important principal components are kept.

In one embodiment, feature extractor engine 201 extracts the features from a business analytic artifact by first selecting the features to extract, such as the layout position, size, data columns, applied filters, etc. Such features to be extracted may be populated in a data structure (e.g., table) by an expert, which may be stored in a storage medium (e.g., memory, disk drive) of business analytic artifact transformer 102. Feature extractor engine 201 then selects the features to be extracted from the business analytic artifact based on those features listed in such a data structure. In one embodiment, feature extractor engine 201 selects such features to be extracted in the business analytic artifact using correlation, univariate feature selection, tree-based feature selection, etc. In one embodiment, such features may then be extracted using principle component analysis.

In one embodiment, feature extractor engine 201 extracts features from a business analytic artifact, such as a graph, using various software tools, such as the node2Vec, struc2vec, and DeepWalk, which create graph embeddings. Such embeddings may be used to build a k-nearest neighbor similarity graph, where the similarity graph could then be used to make recommendations (feature recommendations) as part of a k-nearest neighbor query.

In operation 603, constraint determiner engine 202 of business analytic artifact transformer 102 determines the constraints for a transformed representation of the business analytic artifact.

As discussed above, in one embodiment, constraint determiner engine 202 determines such constraints based on the target device (e.g., computing device 101) to display the transformed business analytic artifact, which may be provided to business analytic artifact transformer 102 from the user of the target device (e.g., computing device 101). Such constraints include, but not limited to, target height and/or width of the transformed representation of the business analytic artifact, the target aspect ratio of the transformed representation of the business analytic artifact, etc.

In one embodiment, constraint determiner engine 202 determines the constraints for the transformed representation of the business analytic artifact based on the attributes (e.g., size, aspect ratio, etc.) of the area that the new artifact will be rendered. Such attributers may be determined based on the target device provided by the user (e.g., user of computing device 101). In one embodiment, constraint determiner engine 202 utilizes a data structure (e.g., table) that lists the attributes associated with various target devices. Once constraint determiner engine 202 receives an identification of the target device from the user, constraint determiner engine 202 searches the data structure for that target device. After identifying the target device in the data structure, constraint determiner engine 202 obtains the attributes associated with that target device from the data structure. For example, if the target device is a particular smartphone computing device, then such a smartphone may be associated with the attributes of a particular resolution, a particular width of the display area, etc.

In one embodiment, constraint determiner engine 202 receives the constraints for the transformed representation of the business analytic artifact directly from the user (e.g., user of computing device 101). Such constraints may be inputted by the user to computing device 101 via an input means (e.g., keyboard, mouse), which may be transmitted to business analytic artifact transformer 102 via network 103. In one embodiment, various options for constraints (e.g., screen size, aspect ratio) may be presented to the user (e.g., user of computing device 101) on the graphical user interface of computing device 101. User selections of these constraint options may then be transmitted to business analytic artifact transformer 102 via network 103. For example, the user may input the constraint of having the browser window fit a 2:1 aspect ratio with a height of 500 pixels.

In operation 604, heuristic-based search engine 203 of business analytic artifact transformer 102 performs a heuristic-based search on the space of possible transformations (a plurality of transformations) of the business analytic artifact using the extracted features to identify a transformed representation of the business analytic artifact that satisfies all the determined constraints and maximizes readability.

As stated above, in one embodiment, the heuristic-based search engine 203 utilizes a heuristic search algorithm that performs an A* search on the space of artifact transformations.

In one embodiment, heuristic-based search engine 203 utilizes a heuristic search algorithm for identifying a transformed version that satisfies the determined constraints and maximizes readability using a search tree. In one embodiment, at each step of the search tree, one or more of the following actions may take place: resizing a visualization, removing a visualization, cropping a visualization and repositioning a visualization.

In operation 605, heuristic-based search engine 203 of business analytic artifact transformer 102 generates a score ("final score") for each transformed representation of the business analytic artifact based on the extent that the transformed representation of the business analytic artifact satisfies the determined constraints and maximizes readability.

As discussed above, in one embodiment, in one embodiment, heuristic-based search engine 203 is configured to generate a final score for each transformed version (transformed version or representation of the business analytic artifact) based on the extent that the transformed version satisfies the determined constraints and maximizes readability. In one embodiment, the final score is a scaled score between the values of 0 to 1. In one embodiment, the "final score" for each transformed version is based on a series of scores assigned to each feature (each extracted feature) and/or visualizations of the transformed representation of the business analytic artifact. In one embodiment, each score assigned to each feature and/or visualizations of the transformed representation of the business analytic artifact is a scaled score between the values of 0 and 1, where the scaled score is based on how close the feature and/or visualization of the transformed version satisfies the constraints of the target device as discussed further below. In one embodiment, the closer that the feature and/or visualization of the transformed version satisfies the constraints of the target device, the higher the score and vice-versa.

In one embodiment, heuristic-based search engine 203 assigns different weight values to each feature (each extracted feature) of the transformed representation of the business analytic artifact. In one embodiment, the final score for the transformed representation of the business analytic artifact is based on the score assigned to each feature of the transformed representation of the business analytic artifact multiplied by the weight values assigned to the features of the transformed representation of the business analytic artifact.

In one embodiment, the transformed representation of the business analytic artifact is assigned a score based on predetermined criteria, which may be user-specified, that includes one or more of the following: number of data points being rendered in the transformed representation of the business analytic artifact, number of high-valued data points being rendered in the transformed representation of the business analytic artifact, number of column combinations being visualized in the transformed representation of the business analytic artifact, and number of high-valued columns being visualized in the transformed representation of the business analytic artifact.

In one embodiment, the user (e.g., user of computing device 101) can specify the amount of weight to be applied to satisfying the constraints versus maintaining recognizability of the data in the original artifact (original business analytic artifact). Such weight may be applied by heuristic-based search engine 203 in generating the final score for the transformed representation of the business analytic artifact.

In one embodiment, the heuristic function used by the search algorithm evaluates any given state (i.e., the transformed business analytic artifact) in the search tree using the factor of how close the current transformed artifact is to the determined constraints. For example, if the determined constraint is to create a new artifact (i.e., the transformed representation of the business analytic artifact) that has a maximum height of 100 pixels and the current transformed business analytic artifact that is being evaluated by the heuristic function is 200 pixels, then this state will receive a lower score by heuristic-based search engine 203 than a transformed representation of the business analytic artifact that is 150 pixels in height.

In one embodiment, the heuristic function used by the search algorithm may further evaluate any given state (i.e., the transformed business analytic artifact) in the search tree using the factor of how close the result of the feature extraction on the transformed business analytic artifact is to the features on the original business analytic artifact. In one embodiment, the closer the features extracted (e.g., layout position, size) on the transformed business analytic artifact are to the features on the original business analytic artifact, the higher the score assigned to the transformed business analytic artifact by heuristic-based search engine 203. In one embodiment, such a comparison is performed by comparison software tools (e.g., Adobe® Lightroom, Diffchecker, Image Comparer™ by Bolide® Software, ACDSee® Photo Studio Ultimate, etc.) to identify any differences. The greater the difference, the lower the score assigned to the transformed business analytic artifact by heuristic-based search engine 203 and vice-versa.

In one embodiment, such "closeness" may be determined using the differences in the extracted data points. For example, feature extractor engine 201 extracts features, including the underlying data displayed by the business analytic artifact (e.g., dashboard), so that changes in how the underlying data is displayed in the transformation (i.e., the transformed business analytic artifact) can be determined. The closer the underlying data in the transformed business analytic artifact is to the same underlying data in the original business analytic artifact, the better the "readability" is said to be and the higher the score assigned to the transformed business analytic artifact by heuristic-based search engine 203. In contrast, the farther the underlying data in the transformed business analytic artifact is to the same underlying data in the original business analytic artifact, the worse the "readability" is said to be and the lower the score assigned to the transformed business analytic artifact by heuristic-based search engine 203. In one embodiment, such a comparison is performed by comparison software tools (e.g., Adobe® Lightroom, Diffchecker, Image Comparer™ by Bolide® Software, ACDSee® Photo Studio Ultimate, JuxtAPPose, QlikView®, etc.) to identify any differences in the underlying data between the transformed business analytic artifact and the original business analytic artifact.

In operation 606, heuristic-based search engine 203 of business analytic artifact transformer 102 selects the transformed representation of the business analytic artifact that has the highest score to be displayed on the user's computing device (e.g., computing device 101).

In one embodiment, a time constraint is provided to the search algorithm used by heuristic-based search engine 203 which sets the maximum amount of time that heuristic-based search engine 203 identifies the transformed representation of the business analytic artifact that satisfies the set of constraints (see operation 603) and maximizes readability. If heuristic-based search engine 203 does not identify such a transformed representation of the business analytic artifact within the allotted time, then heuristic-based search engine 203 may select one of the previously generated transformations with the highest score for similar constraints. In one embodiment, previously generated transformations along with the constraints satisfied by such transformations are stored in a storage medium (e.g., memory, disk drive) of business analytic artifact transformer 102.

In operation 607, display engine 204 of business analytic artifact transformer 102 displays the selected transformed representation or version of the business analytic artifact on a display of the user's computing device (e.g., computing device 101).

In this manner, meaningful transformations of business analytic artifacts are generated and displayed on a computing device (e.g., smartphone) with minimal distortion.

As a result of the foregoing, embodiments of the present disclosure provide a means for generating a visual transformation of a business analytic artifact that fits a set of constraints and maximizes readability in a manner that limits the amount of distortion when depicted on a different display.

Furthermore, the principles of the present disclosure improve the technology or technical field involving data visualization. As discussed above, data visualization is an interdisciplinary field that deals with the graphic representation of data. To communicate information clearly and efficiently, data visualization uses statistical graphics, plots, information graphics and other tools. In connection with data visualization, business analytic artifacts, such as dashboards, reports and charts, may need to be transformed into different shapes, sizes, resolutions, etc., such as by cropping, resizing, etc., when depicted on a different display. For example, since different displays possess different features, such as different screen shapes, sizes and resolutions, the visualizations of the business analytic artifacts depicted on such different displays may differ. For instance, the shapes, sizes, resolutions, etc. of the business analytic artifacts may differ when displayed on the display of a desktop computing device versus being displayed on the display of a mobile device, such as a smartphone. Unfortunately, when the business analytic artifacts are transformed, such as by resizing and cropping, the transformed business analytic artifact may be distorted to the extent that the visualization no longer effectively visualizes the data. Different data visualization systems have been developed in an attempt to minimize such distortions, such as by having the layout engine adapt the layout to react to changes in the available display space (e.g., alternate number of columns in a grid based on the screen size for an application with a grid view) or by reducing the padding between widgets or providing alternate views of individual widgets (e.g., compact versus full view). Unfortunately, despite such efforts, business analytic artifacts, such as dashboards, reports and charts, still become distorted when transformed and depicted on a different display.

Embodiments of the present disclosure improve such technology by extracting features (e.g., layout position, size) from a received business analytic artifact (e.g., dashboard, report, chart). Furthermore, constraints are determined for a transformed representation of the business analytic artifact. In one embodiment, such constraints are based on the target device (device upon which the transformed representation of the business analytic artifact will be displayed). Examples of constraints include, but not limited to, target height and/or width of the transformed representation of the business analytic artifact, the target aspect ratio of the transformed representation of the business analytic artifact, etc. A heuristic-based search is then performed on a space of possible transformed representations of the business analytic artifact using the extracted features to identify a transformed version that satisfies the determined constraints and maximizes readability. A final score is then generated for each possible transformed representation of the business analytic artifact based on the extent that the transformed representation of the business analytic artifact satisfies the determined constraints and maximizes the readability. The transformed representation of the business analytic artifact that has the highest score is selected and displayed on the target device. In this manner, meaningful transformations of business analytic artifacts are generated and displayed on a computing device (e.g., smartphone) with minimal distortion. Furthermore, in this manner, there is an improvement in the technical field involving data visualization.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for generating a visual transformation of a business analytic artifact, the method comprising:
   receiving said business analytic artifact;
   extracting features from said business analytic artifact stored in metadata using a technique selected from the group consisting of: correlation, univariate feature selection, tree-based feature selection, and principle component analysis;
   determining constraints for a transformed representation of said business analytic artifact based on attributes of an area that a new artifact will be rendered, wherein said attributes of said area are determined based on a target device by utilizing a data structure that lists attributes associated with said target device;
   performing a heuristic-based search on a space of a plurality of transformed representations of said business analytic artifact using said extracted features;
   generating a final score for each of said plurality of transformed representations of said business analytic artifact based on extent its transformed representation of said business analytic artifact satisfies said determined constraints and maximizes readability;
   selecting a transformed representation of said business analytic artifact associated with a highest score within a time constraint, wherein a previously generated transformed representation of said business analytic artifact is selected in response to not being able to identify said transformed representation of said business analytic artifact that satisfies said determined constraints and maximizes readability within said time constraint; and
   displaying said selected transformed representation of said business analytic artifact on a display of said target device.

2. The method as recited in claim 1, wherein said extracted features comprise the following: layout position, size, type of visualization, columns bounded to slots of visualization, a filter, a sort order, an aggregation, a grouping, and data.

3. The method as recited in claim 1, wherein said constraints are determined based on the following: a display area of said display of said computing device, and an input from a user of said computing device.

4. The method as recited in claim 1 further comprising:
   generating said final score for each of said plurality of transformed representations of said business analytic artifact based on a score assigned to each feature of said transformed representation of said business analytic artifact multiplied by weight values assigned to said features of said transformed representation of said business analytic artifact.

5. The method as recited in claim 1, wherein said heuristic-based search comprises the following:
   resizing a visualization of said business analytic artifact;
   removing a visualization of said business analytic artifact;
   cropping a visualization of said business analytic artifact; and
   repositioning a visualization of said business analytic artifact.

6. The method as recited in claim 1, wherein said features are extracted from said business analytic artifact using principal component analysis, wherein said principal component analysis comprises identifying relationships among said features of said business analytic artifact through a covariance matrix, wherein eigenvalues are obtained through a linear transformation or eigendecomposition of said covariance matrix, wherein said relationships among said features of said business analytic artifact are quantified using said eigenvalues.

7. The method as recited in claim 1, wherein said final score is generated for a first transformed representation of said business analytic artifact based on predetermined criteria comprising the following: number of data points being rendered in said first transformed representation of said business analytic artifact, number of high-valued data points being rendered in said first transformed representation of said business analytic artifact, number of column combinations being visualized in said first transformed representation of said business analytic artifact, and number of high-valued columns being visualized in said first transformed representation of said business analytic artifact.

8. A computer program product for generating a visual transformation of a business analytic artifact, the computer program product comprising one or more computer readable storage mediums having program code embodied therewith, the program code comprising programming instructions for:
  receiving said business analytic artifact;
  extracting features from said business analytic artifact stored in metadata using a technique selected from the group consisting of: correlation, univariate feature selection, tree-based feature selection, and principle component analysis;
  determining constraints for a transformed representation of said business analytic artifact based on attributes of an area that a new artifact will be rendered, wherein said attributes of said area are determined based on a target device by utilizing a data structure that lists attributes associated with said target device;
  performing a heuristic-based search on a space of a plurality of transformed representations of said business analytic artifact using said extracted features;
  generating a final score for each of said plurality of transformed representations of said business analytic artifact based on extent its transformed representation of said business analytic artifact satisfies said determined constraints and maximizes readability;
  selecting a transformed representation of said business analytic artifact associated with a highest score within a time constraint, wherein a previously generated transformed representation of said business analytic artifact is selected in response to not being able to identify said transformed representation of said business analytic artifact that satisfies said determined constraints and maximizes readability within said time constraint; and
  displaying said selected transformed representation of said business analytic artifact on a display of said target device.

9. The computer program product as recited in claim 8, wherein said extracted features comprise the following: layout position, size, type of visualization, columns bounded to slots of visualization, a filter, a sort order, an aggregation, a grouping, and data.

10. The computer program product as recited in claim 8, wherein said constraints are determined based on the following: a display area of said display of said computing device, and an input from a user of said computing device.

11. The computer program product as recited in claim 8, wherein the program code further comprises the programming instructions for:
  generating said final score for each of said plurality of transformed representations of said business analytic artifact based on a score assigned to each feature of said transformed representation of said business analytic artifact multiplied by weight values assigned to said features of said transformed representation of said business analytic artifact.

12. The computer program product as recited in claim 8, wherein said heuristic-based search comprises the following:
  resizing a visualization of said business analytic artifact;
  removing a visualization of said business analytic artifact;
  cropping a visualization of said business analytic artifact; and
  repositioning a visualization of said business analytic artifact.

13. The computer program product as recited in claim 8, wherein said features are extracted from said business analytic artifact using principal component analysis, wherein said principal component analysis comprises identifying relationships among said features of said business analytic artifact through a covariance matrix, wherein eigenvalues are obtained through a linear transformation or eigendecomposition of said covariance matrix, wherein said relationships among said features of said business analytic artifact are quantified using said eigenvalues.

14. The computer program product as recited in claim 8, wherein said final score is generated for a first transformed representation of said business analytic artifact based on predetermined criteria comprising the following: number of data points being rendered in said first transformed representation of said business analytic artifact, number of high-valued data points being rendered in said first transformed representation of said business analytic artifact, number of column combinations being visualized in said first transformed representation of said business analytic artifact, and number of high-valued columns being visualized in said first transformed representation of said business analytic artifact.

15. A system, comprising:
  a memory for storing a computer program for generating a visual transformation of a business analytic artifact; and
  a processor connected to said memory, wherein said processor is configured to execute program instructions of the computer program comprising:
    receiving said business analytic artifact;
    extracting features from said business analytic artifact stored in metadata using a technique selected from the group consisting of: correlation, univariate feature selection, tree-based feature selection, and principle component analysis;
    determining constraints for a transformed representation of said business analytic artifact based on attributes of an area that a new artifact will be rendered, wherein said attributes of said area are determined based on a target device by utilizing a data structure that lists attributes associated with said target device;
    performing a heuristic-based search on a space of a plurality of transformed representations of said business analytic artifact using said extracted features;
    generating a final score for each of said plurality of transformed representations of said business analytic artifact based on extent its transformed representation of said business analytic artifact satisfies said determined constraints and maximizes readability;
    selecting a transformed representation of said business analytic artifact associated with a highest score within a time constraint, wherein a previously generated transformed representation of said business analytic artifact is selected in response to not being able to identify said transformed representation of said business analytic artifact that satisfies said determined constraints and maximizes readability within said time constraint; and displaying said selected transformed representation of said business analytic artifact on a display of said target device.

16. The system as recited in claim 15, wherein said extracted features comprise the following: layout position, size, type of visualization, columns bounded to slots of visualization, a filter, a sort order, an aggregation, a grouping, and data.

17. The system as recited in claim 15, wherein said constraints are determined based on the following: a display area of said display of said computing device, and an input from a user of said computing device.

18. The system as recited in claim 15, wherein the program instructions of the computer program further comprise:

generating said final score for each of said plurality of transformed representations of said business analytic artifact based on a score assigned to each feature of said transformed representation of said business analytic artifact multiplied by weight values assigned to said features of said transformed representation of said business analytic artifact.

19. The system as recited in claim 15, wherein said heuristic-based search comprises the following:

resizing a visualization of said business analytic artifact;
removing a visualization of said business analytic artifact;
cropping a visualization of said business analytic artifact; and
repositioning a visualization of said business analytic artifact.

20. The system as recited in claim 15, wherein said features are extracted from said business analytic artifact using principal component analysis, wherein said principal component analysis comprises identifying relationships among said features of said business analytic artifact through a covariance matrix, wherein eigenvalues are obtained through a linear transformation or eigendecomposition of said covariance matrix, wherein said relationships among said features of said business analytic artifact are quantified using said eigenvalues.

* * * * *